US012567074B2

(12) United States Patent
Mehrotra et al.

(10) Patent No.: US 12,567,074 B2
(45) Date of Patent: Mar. 3, 2026

(54) GENERATIVE AI FOR CUSTOMER SUPPORT ACCELERATION

(71) Applicant: Rockwell Automation Technologies, Inc., Mayfield Heights, OH (US)

(72) Inventors: Abhishek Mehrotra, New Berlin, WI (US); Steven P. Taylor, Madison, WI (US); Jessica L. Wiant, Chagrin Falls, OH (US); Aparna Ravindranath, Mayfield Heights, OH (US); Britney Flores, Sussex, WI (US); Pratyush Kumar Rout, Pune (IN)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 104 days.

(21) Appl. No.: 18/531,109

(22) Filed: Dec. 6, 2023

(65) Prior Publication Data

US 2025/0148477 A1    May 8, 2025

Related U.S. Application Data

(60) Provisional application No. 63/595,381, filed on Nov. 2, 2023.

(51) Int. Cl.
G06Q 30/01 (2023.01)
G06F 40/40 (2020.01)
G06N 3/0475 (2023.01)

(52) U.S. Cl.
CPC ............. G06Q 30/01 (2013.01); G06F 40/40 (2020.01); G06N 3/0475 (2023.01)

(58) Field of Classification Search
None
See application file for complete search history.

(56) References Cited

U.S. PATENT DOCUMENTS 9,672,497 B1 * 6/2017 Lewis ................... G06F 40/284
9,691,069 B2 * 6/2017 Ilagan ..................... H04L 12/66
(Continued)

FOREIGN PATENT DOCUMENTS

EP          4506844 A1    2/2025
WO     WO-2018200979 A1 * 11/2018 ........... G06F 16/242
(Continued)

OTHER PUBLICATIONS

Aras Bozkurt. "Generative artificial intelligence (AI) powered conversational educational agents: The inevitable paradigm shift." (Apr. 2023). Retrieved online Jun. 1, 2025. (Year: 2023) https://www.researchgate.net/publication/369763095_Generative_artificial_intelligence_AI_powered_conversational_educational_agents_The_inevitable_paradigm_shift (Year: 2023).*

(Continued)

*Primary Examiner* — James A Reagan
(74) *Attorney, Agent, or Firm* — Amin, Turocy & Watson, LLP

(57) ABSTRACT

An industrial technical support system acts as an interactive assistant that leverages generative artificial intelligence (AI) techniques to suggest solutions to industrial alarm conditions or other performance problems based on earlier documented solutions, thereby expediting the process of finding alarm resolutions. The system enhances a user's prompt with relevant contextual data retrieved from stored documentation as well as relevant past chat histories to assist the system's generative AI model in recommending accurate resolutions to alarm conditions or performance issues described by the user's prompt.

20 Claims, 13 Drawing Sheets

(56) References Cited

U.S. PATENT DOCUMENTS

| | | | | |
|---|---|---|---|---|
| 9,990,596 | B2 * | 6/2018 | Maturana | G05B 19/058 |
| 10,026,049 | B2 | 7/2018 | Asenjo et al. | |
| 11,164,091 | B1 * | 11/2021 | Flowers | G06Q 20/042 |
| 11,609,907 | B2 * | 3/2023 | Shaik | G06F 16/2282 |
| 11,609,908 | B2 * | 3/2023 | Shaik | G06F 16/2282 |
| 11,726,994 | B1 * | 8/2023 | Wang | G06F 16/24573 |
| | | | | 707/769 |
| 11,748,392 | B1 * | 9/2023 | Mahony | G06F 16/3344 |
| 11,790,081 | B2 | 10/2023 | D'Amato et al. | |
| 11,816,573 | B1 * | 11/2023 | Garvey | G06F 16/345 |
| 11,875,362 | B1 * | 1/2024 | White, Jr. | G06Q 30/016 |
| 12,079,585 | B1 * | 9/2024 | Garvey | G06F 40/40 |
| 12,126,643 | B1 * | 10/2024 | Skarphedinsson | |
| | | | | H04L 63/1441 |
| 12,137,111 | B2 | 11/2024 | Bassi et al. | |
| 12,309,185 | B1 * | 5/2025 | Skarphedinsson | |
| | | | | G06F 16/9038 |
| 2006/0277096 | A1 * | 12/2006 | Levitus | G06Q 10/10 |
| | | | | 714/25 |
| 2011/0161210 | A1 * | 6/2011 | Edwards | G06Q 40/12 |
| | | | | 705/30 |
| 2013/0247194 | A1 | 9/2013 | Jha et al. | |
| 2014/0337086 | A1 | 11/2014 | Asenjo et al. | |
| 2015/0147999 | A1 * | 5/2015 | Venezia | G06Q 30/016 |
| | | | | 455/405 |
| 2016/0132595 | A1 * | 5/2016 | Bliss | H04L 67/10 |
| | | | | 707/706 |
| 2016/0248800 | A1 | 8/2016 | Ng et al. | |
| 2016/0330222 | A1 | 11/2016 | Brandt et al. | |
| 2017/0220574 | A1 * | 8/2017 | Liensberger | G06F 16/24522 |
| 2017/0249356 | A1 * | 8/2017 | Hays | G06F 16/243 |
| 2017/0310690 | A1 | 10/2017 | Mestha et al. | |
| 2018/0181561 | A1 * | 6/2018 | Raanani | G06F 15/76 |
| 2018/0316701 | A1 | 11/2018 | Holzhauer et al. | |
| 2018/0336198 | A1 * | 11/2018 | Zhong | G06N 3/08 |
| 2019/0056722 | A1 | 2/2019 | Abbaszadeh et al. | |
| 2019/0294678 | A1 * | 9/2019 | Sapugay | G06F 40/211 |
| 2020/0136928 | A1 * | 4/2020 | Sethi | H04L 41/16 |
| 2020/0137090 | A1 | 4/2020 | Holzhauer et al. | |
| 2020/0349151 | A1 * | 11/2020 | Bourne | G06F 16/24534 |
| 2020/0380076 | A1 * | 12/2020 | Taylor | G06F 40/289 |
| 2020/0382450 | A1 * | 12/2020 | Vaughn | H04L 51/02 |
| 2020/0387550 | A1 * | 12/2020 | Cappetta | G06F 16/9538 |
| 2021/0067471 | A1 * | 3/2021 | Taylor | H04L 51/02 |
| 2021/0157985 | A1 * | 5/2021 | Rotkop | G06F 40/205 |
| 2021/0256534 | A1 * | 8/2021 | An | G06N 3/08 |
| 2021/0390101 | A1 * | 12/2021 | Shaik | G06F 16/2282 |
| 2022/0121656 | A1 * | 4/2022 | Zheng | G06F 18/24133 |
| 2022/0309250 | A1 * | 9/2022 | Das | G06N 5/04 |
| 2022/0327221 | A1 | 10/2022 | Gitelman et al. | |
| 2023/0058974 | A1 | 2/2023 | Yan et al. | |
| 2023/0245651 | A1 * | 8/2023 | Wang | G06N 5/022 |
| | | | | 704/275 |
| 2024/0135388 | A1 * | 4/2024 | White, Jr. | G06Q 10/06395 |
| 2024/0163304 | A1 | 5/2024 | Gupta | |
| 2024/0331071 | A1 * | 10/2024 | Ouellette | G08B 13/08 |
| 2024/0345914 | A1 * | 10/2024 | Selvaraj | G05B 19/042 |
| 2024/0346060 | A1 * | 10/2024 | Brown | G06Q 50/163 |
| 2024/0354789 | A1 * | 10/2024 | Garvey | G06N 20/00 |
| 2024/0362257 | A1 * | 10/2024 | Nageshwar | G06N 20/00 |
| 2024/0419711 | A1 * | 12/2024 | Kaushal | G06F 16/3344 |
| 2025/0076836 | A1 * | 3/2025 | Carrara | G05B 19/042 |
| 2025/0077391 | A1 * | 3/2025 | Carrara | G06F 11/3672 |
| 2025/0094764 | A1 * | 3/2025 | Hudson | G06N 3/006 |
| 2025/0110948 | A1 * | 4/2025 | Nguyen | G06F 16/283 |
| 2025/0138896 | A1 * | 5/2025 | Cohen | G06F 9/5038 |
| 2025/0148477 | A1 * | 5/2025 | Mehrotra | G06Q 30/01 |

FOREIGN PATENT DOCUMENTS

| | | | | | |
|---|---|---|---|---|---|
| WO | WO-2024215877 | A1 * | 10/2024 | | G05B 15/02 |
| WO | WO-2024238577 | A1 * | 11/2024 | | G05B 15/02 |

OTHER PUBLICATIONS

Cheonsu Jeong. "A Study on the Implementation of Generative AI Services Using an Enterprise Data-Based LLM Application Architecture." (Oct. 29, 2023). Retrieved online Jun. 1, 2025. https://www.oajaiml.com/uploads/archivepdf/94881191.pdf (Year: 2023).*

Mohit Mittal. "The Rise of Generative AI: Evaluating Large Language Models for Code and Content Generation." (Apr. 2023). Retrieved online Jun. 1, 2025. https://philarchive.org/archive/MOHTRO-15 (Year: 2023).*

Non-Final Office Action received for U.S. Appl. No. 18/919,994 dated Jan. 14, 2026, 21 pages.

Adebayo et al., "The Role of Artificial Intelligence in Asset Management of Enterprise Systems", 2022 International Conference on Innovation and Intelligence for Informatics, Computing, and Technologies (3ICT), 2022, pp. 214-220.

Iturbe et al., "Information Security Risk Assessment Methodology for Industrial Systems Supporting ISA/IEC 62443 Compliance", International Conference on Electrical, Computer and Energy Technologies (ICECET 2023), Nov. 2023, 10 pages.

* cited by examiner

Figure 5:
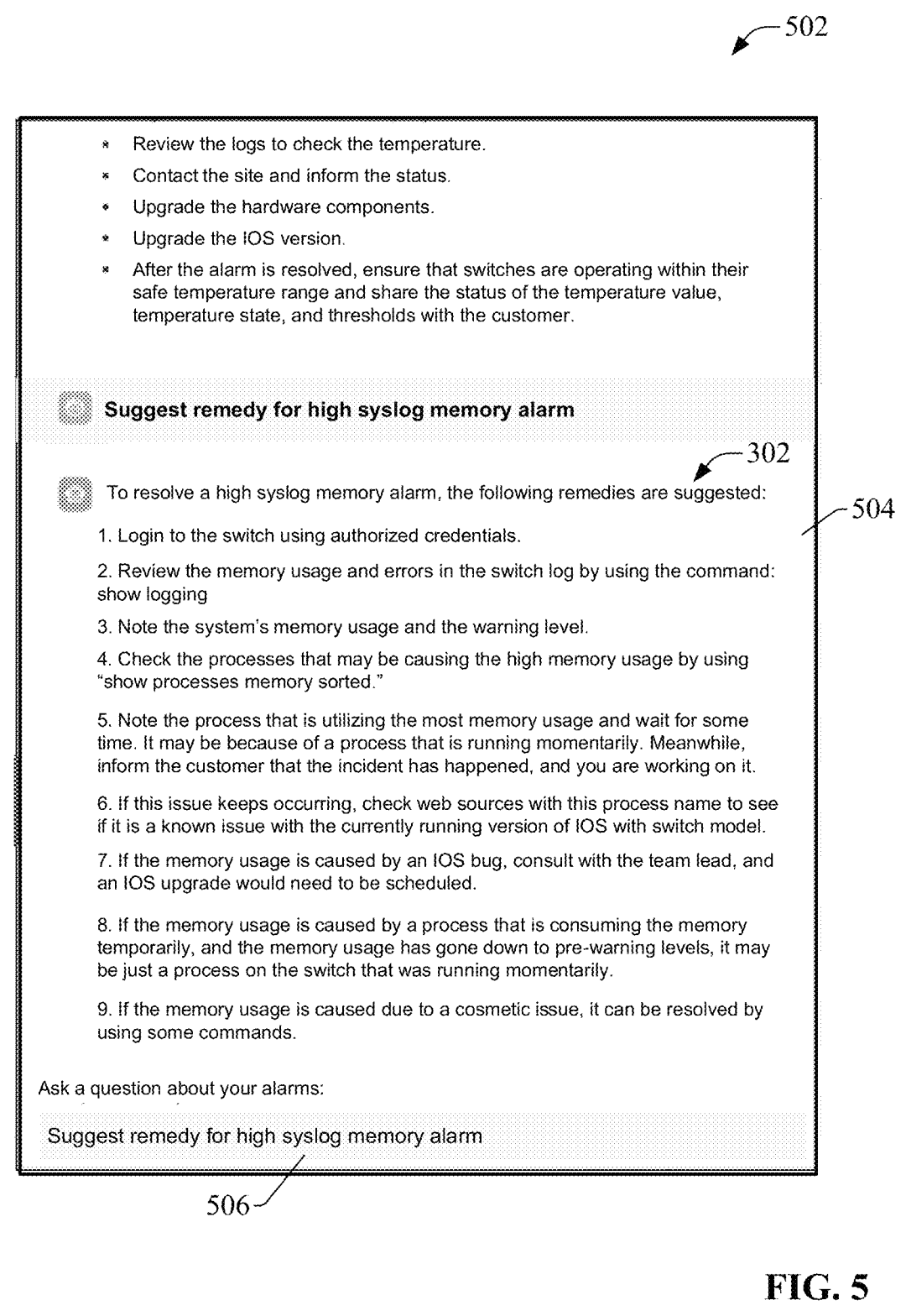

502

* Review the logs to check the temperature.
* Contact the site and inform the status.
* Upgrade the hardware components.
* Upgrade the IOS version.
* After the alarm is resolved, ensure that switches are operating within their safe temperature range and share the status of the temperature value, temperature state, and thresholds with the customer.

Suggest remedy for high syslog memory alarm

302

To resolve a high syslog memory alarm, the following remedies are suggested:

504

1. Login to the switch using authorized credentials.

2. Review the memory usage and errors in the switch log by using the command: show logging 3. Note the system's memory usage and the warning level.

4. Check the processes that may be causing the high memory usage by using "show processes memory sorted."

5. Note the process that is utilizing the most memory usage and wait for some time. It may be because of a process that is running momentarily. Meanwhile, inform the customer that the incident has happened, and you are working on it.

6. If this issue keeps occurring, check web sources with this process name to see if it is a known issue with the currently running version of IOS with switch model.

7. If the memory usage is caused by an IOS bug, consult with the team lead, and an IOS upgrade would need to be scheduled.

8. If the memory usage is caused by a process that is consuming the memory temporarily, and the memory usage has gone down to pre-warning levels, it may be just a process on the switch that was running momentarily.

9. If the memory usage is caused due to a cosmetic issue, it can be resolved by using some commands.

Ask a question about your alarms:

Suggest remedy for high syslog memory alarm

TECHNICAL SUPPORT SYSTEM (202)

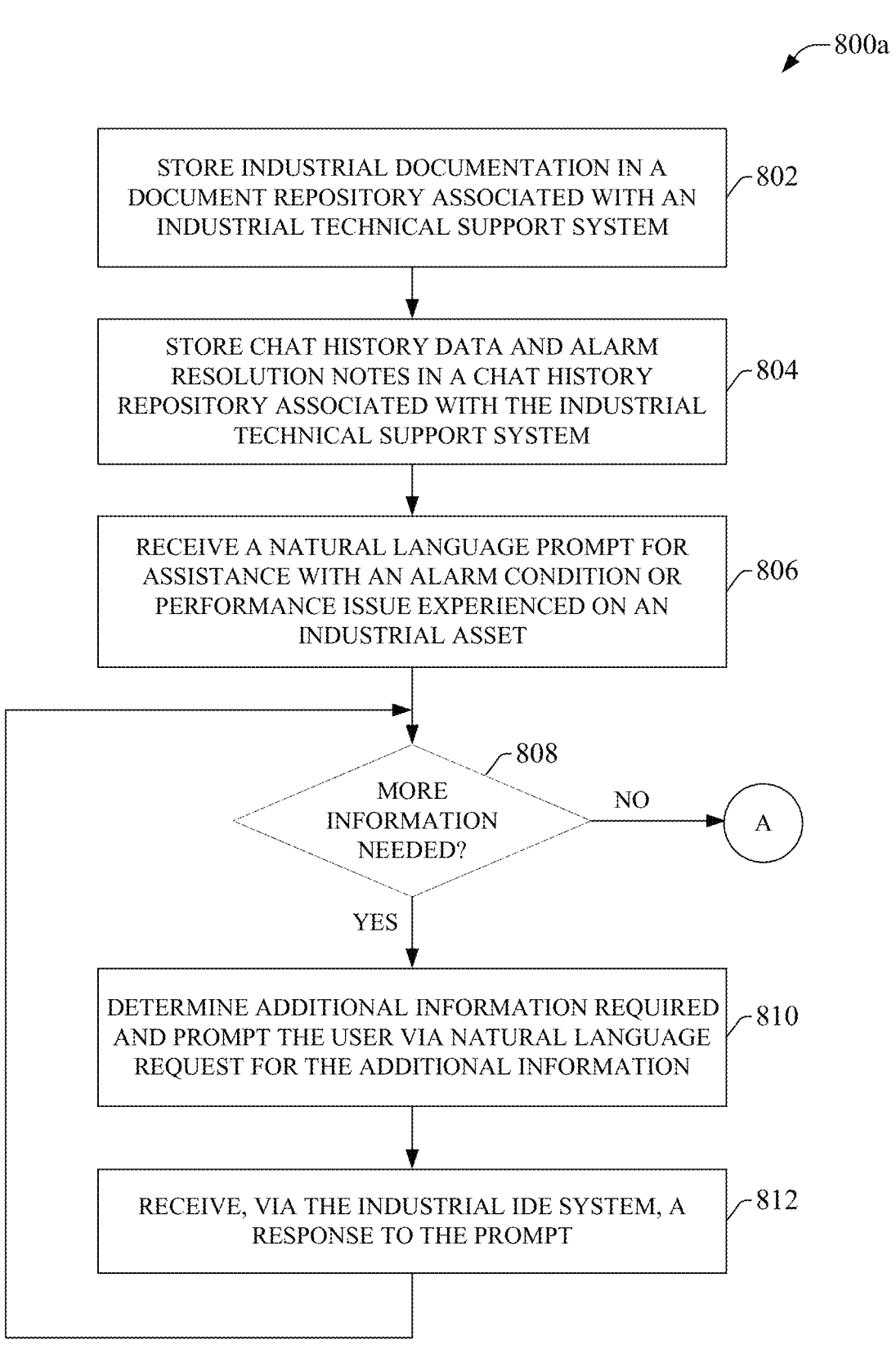

800a

STORE INDUSTRIAL DOCUMENTATION IN A DOCUMENT REPOSITORY ASSOCIATED WITH AN INDUSTRIAL TECHNICAL SUPPORT SYSTEM — 802

STORE CHAT HISTORY DATA AND ALARM RESOLUTION NOTES IN A CHAT HISTORY REPOSITORY ASSOCIATED WITH THE INDUSTRIAL TECHNICAL SUPPORT SYSTEM — 804

RECEIVE A NATURAL LANGUAGE PROMPT FOR ASSISTANCE WITH AN ALARM CONDITION OR PERFORMANCE ISSUE EXPERIENCED ON AN INDUSTRIAL ASSET — 806

MORE INFORMATION NEEDED? — 808

NO → A

YES

DETERMINE ADDITIONAL INFORMATION REQUIRED AND PROMPT THE USER VIA NATURAL LANGUAGE REQUEST FOR THE ADDITIONAL INFORMATION — 810

RECEIVE, VIA THE INDUSTRIAL IDE SYSTEM, A RESPONSE TO THE PROMPT — 812

FIG. 8a

GENERATIVE AI FOR CUSTOMER SUPPORT ACCELERATION

CROSS-REFERENCE TO RELATED APPLICATIONS

This application claims priority to U.S. Provisional Application Ser. No. 63/595,381, filed on Nov. 2, 2023, and entitled "GENERATIVE AI FOR CUSTOMER SUPPORT ACCELERATION," the entirety of which is incorporated herein by reference.

TECHNICAL FIELD

The subject matter disclosed herein relates generally to industrial automation systems, and, for example, to resolution of industrial alarm conditions or performance issues

BACKGROUND ART

Maintenance and troubleshooting of a plant's industrial control systems and their associated machines and devices are typically carried out by on-site service engineers or machine operators. While some types of routine machine alarm or fault conditions can be easily addressed, unfamiliar alarm conditions or system performance issues require the service personnel to expend considerable time and effort finding resolutions to the problems. These resolution efforts can include referencing device or software manuals or contacting a vendor's customer support personnel for assistance in diagnosing and resolving the condition.

The above-described deficiencies of current approaches to resolving industrial alarm conditions and performance issues are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising a user interface component configured to receive, as natural language input, a prompt specifying a technical support issue relating to an industrial automation system; a context retrieval component configured to retrieve contextual data determined to be relevant to the technical support issue from a repository of industrial documentation, and to retrieve chat history data determined to be relevant to the technical support issue from archived chat histories; and a generative AI component configured to generate, using the generative AI model, a natural language response to the prompt based on analysis of the prompt, the contextual data, and the chat history data, wherein the natural language response describes one or more recommended actions for addressing the technical support issue.

Also, one or more embodiments provide a method, comprising receiving, from a client device by a system comprising a processor, a prompt formatted as natural language input and requesting assistance with a technical support issue relating to an industrial automation system; and in response to the receiving: retrieving, by the system, contextual data determined to be relevant to the technical support issue from a repository of industrial documentation; retrieving, by the system, chat history data determined to be relevant to the technical support issue from archived chat histories; generating, by the system using a generative artificial intelligence (AI) model, a natural language response to the prompt based on analysis of the prompt, the contextual data, and the chat history data, wherein the natural language response describes one or more recommended actions for addressing the technical support issue; and rendering, by the system, the natural language response on the client device.

Also, according to one or more embodiments, a non-transitory computer-readable medium is provided having stored thereon instructions that, in response to execution, cause a system to perform operations, the operations comprising receiving, from a client device, a natural language prompt requesting assistance with a technical support issue relating to an industrial automation system; and in response to the receiving: retrieving contextual data determined to be relevant to the technical support issue from a repository of industrial documentation; retrieving chat history data determined to be relevant to the technical support issue from archived chat histories; generating, using a generative artificial intelligence (AI) model, a natural language response to the prompt based on analysis of the natural language prompt, the contextual data, and the chat history data, wherein the natural language response describes one or more recommended actions for addressing the technical support issue; and displaying the natural language response on the client device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 5 is an example chat window that can be used to interact with the generative AI model.

FIG. 8*a* is a flowchart of a first part of an example methodology for using generative AI to provide technical guidance for resolving industrial alarm conditions or other automation system performance problems.

DETAILED DESCRIPTION

Figure 1:
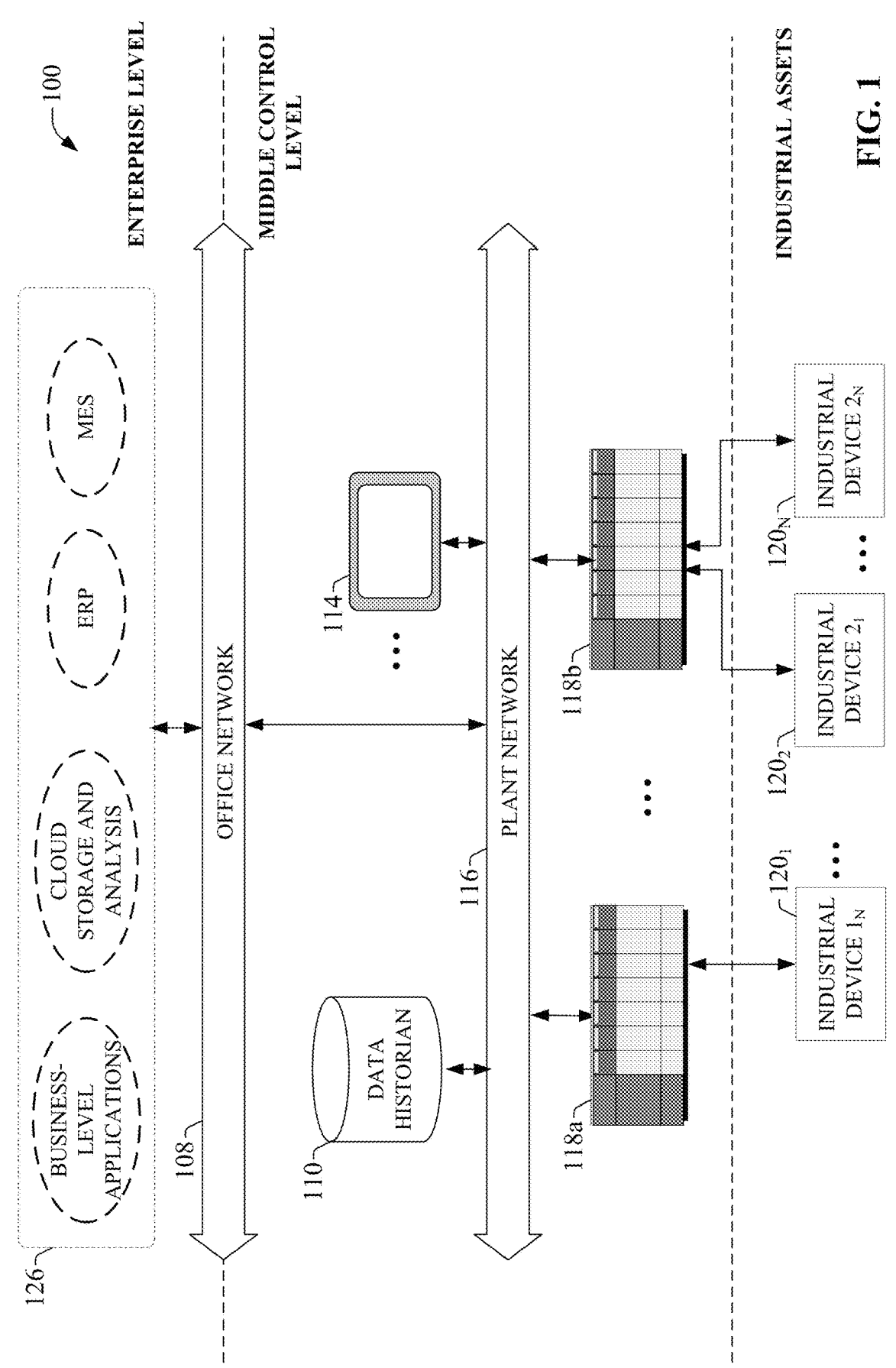
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O)

components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of control code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), present sensing devices (e.g., inductive or capacitive proximity sensors, photoelectric sensors, ultrasonic sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot controllers, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

Maintenance and troubleshooting of a plant's industrial control systems and their associated machines and devices are typically carried out by on-site service engineers or machine operators. While some types of routine machine alarm or fault conditions can be easily addressed, unfamiliar alarm conditions or system performance issues require the service personnel to expend considerable time and effort finding resolutions to the problems. These resolution efforts can include referencing device or software manuals or contacting a vendor's customer support personnel for assistance in diagnosing and resolving the condition.

To address at least some of these or other issues, one or more embodiments described herein provide an industrial technical support system that acts as an interactive assistant that leverages generative artificial intelligence (AI) techniques to suggest solutions to industrial alarm conditions or other performance problems based on earlier documented solutions, thereby expediting the process of finding alarm resolutions. The system enhances a user's prompt with relevant contextual data retrieved from stored documentation as well as relevant past chat histories to assist the system's generative AI model in recommending accurate resolutions to alarm conditions or performance issues described by the user's prompt.

Figure 2:
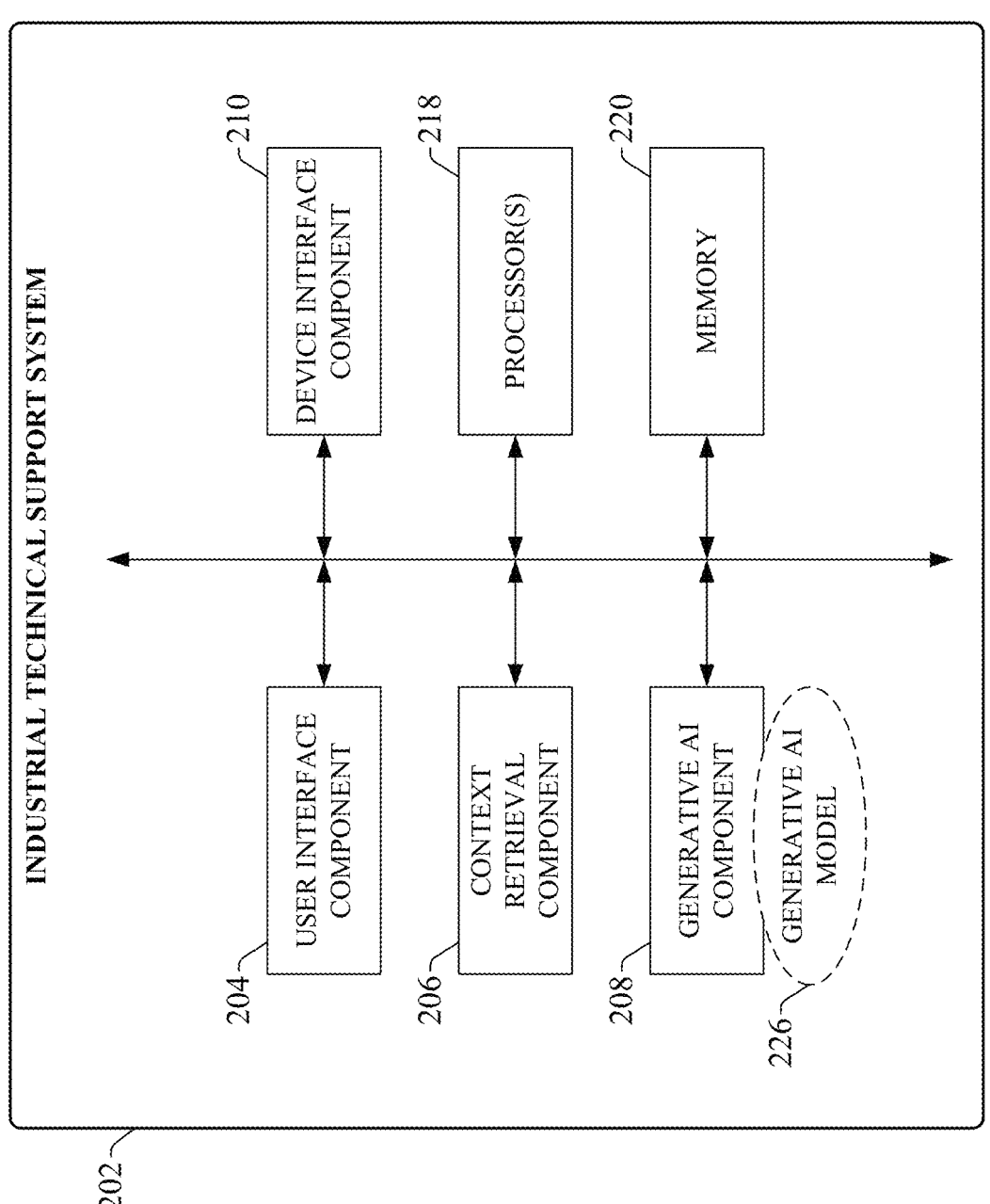
FIG. 2 is a block diagram of an example industrial technical support system.

FIG. 2 is a block diagram of an example industrial technical support system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial technical support system 202 can include a user interface component 204, a context retrieval component 206, a generative AI component 208, a device interface component 210, one or more processors 218, and memory 220. In various embodiments, one or more of the user interface component 204, context retrieval component 206, generative AI component 208, device interface component 210, the one or more processors 218, and memory 220 can be electrically and/or communicatively coupled to one another to perform one or more of the functions of the industrial technical support system 202. In some embodiments, components 204, 206, 208, and 210 can comprise software instructions stored on memory 220 and executed by processor(s) 218. Industrial technical support system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to generate and serve interface displays to a client device (e.g., a laptop computer, tablet computer, smart phone, etc.) that remotely accesses the technical support system 202 (e.g., via a hardwired or wireless connection). The user interface component 204 can then receive user input data and render output data via the client device. Input data that can be received via various embodiments of user interface component 204 can include, but is not limited to, natural language prompts or queries requesting assistance with an automation system alarm or performance conditions. Output data rendered by various embodiments of user interface component 204 can include natural language responses to user prompts as part of a chat-based technical support interaction.

Context retrieval component 206 can be configured to retrieve relevant context to a user's query from various data sources, including at least stored product documentation and archived histories of previous problem resolutions. The retrieved contextual information is then provided to a generative AI model 226 together with the user's query to assist in quickly converging on solutions or support guidance designed to address the user's issue. Generative AI component 208 can be configured to submit the user's query and additional contextual information retrieved by the context retrieval component 206 to the generative AI model 226, which generates a response to the user's query—in the form of insights into the problem conveyed by the query, recommended solutions to the problem-based on processing of this information. Device interface component 210 can be configured to remotely monitor real-time operational and status data from industrial devices, assets, and machines across multiple industrial facilities and customers.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
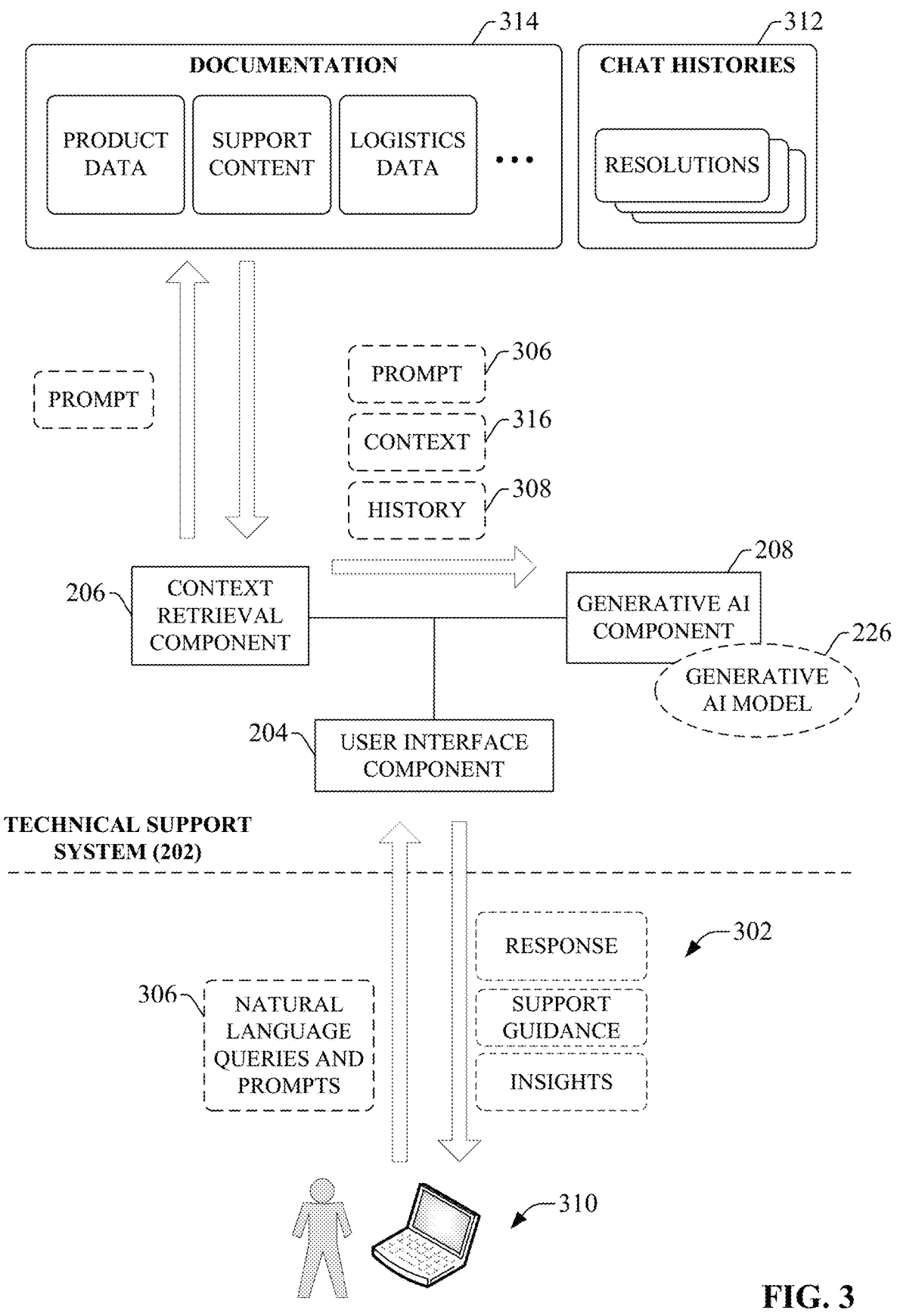
FIG. 3 is a diagram illustrating an example architecture of the industrial technical support system.

FIG. 3 is a diagram illustrating an example architecture of the industrial technical support system 202. Some embodiments of the technical support system 202 can be implemented on a cloud platform, as part of an Internet-of-Things (IoT) system, or on another centralized platform and made accessible to multiple industrial customers having authorized access to use the technical support system 202. Alternatively, some embodiments of technical support system 202 may execute at least partially on a local client device while accessing remote services and repositories as needed.

A client device 310 (e.g., a laptop computer, a tablet computer, a desktop computer, a mobile device, an HMI terminal, a wearable AR/VR appliance, etc.) owned by a user with suitable authentication credentials can access the system's support services. In some embodiments, the technical support system 202 can be an integrated sub-system of a larger industrial monitoring, analytics, or reporting system that monitors industrial assets and manufacturing operations at multiple customer sites and provides real-time alerts or reports to those customers based on this operations tracking. Alternatively, the technical support system 202 may be implemented as a standalone system for providing interactive support assistance to industrial customers.

Technical support system 202 leverages generative AI technologies in connection with providing technical support guidance for addressing alarm conditions or performance issues observed on a customer's industrial machines, assets, or automation systems. To this end, system 202 includes a generative AI component 208 that uses an associated generative AI model 226 to process a user's natural language prompts 306 and formulate responses or technical support guidance based on analysis of the prompts 306 as well as reference to stored documentation 314 and chat histories 312 of prior technical support resolutions. In various embodiments, the model 226 can be any of a diffusion model, a variational autoencoder (VAE), a generative adversarial network (GAN), a language-based generative model such as a large language model (LLM), a generative pre-trained transformer (GPT), a long short-term memory (LSTM) network, or other such models.

Through interaction with technical support interfaces generated by the system's user interface component 204, users can submit technical support requests or queries in the form of natural language prompts 306. In general, these prompts 306 can specify, using natural language, the nature of the technical problem for which the user requires assistance. Example prompts 306 may request information about a device or an observed automation system behavior, recommended countermeasures for observed alarms or performance issues, recommended preventative actions for mitigating future problems, or other such support guidance. These prompts 306 may include such information as a description or name of an alarm that was generated by a machine, device, or automation system (e.g., "Suggest remedy for high syslog memory alarm," "Seeing error code: 5000 what do I need to do to fix it?", etc.); an identity of a device or system for which support is needed together with a description of the type of assistance required (e.g., "How do I replace the fan on my 755 drive?", "What is the repair time for my motor drive?", "What maintenance do I need to do for the MV6000 drive that I have had for about 4 years?", etc.); or other information describing the type of desired support assistance.

Depending on the content of the user's initial prompt 306, the generative AI component 208 may determine that the prompt 306 does not contain sufficient information for providing high-confidence technical support guidance, or that additional information from the user about the problem being observed would yield technical support guidance having a higher probability of aligning with the user's needs. In such cases, the generative AI component 208 can render, via the user interface component 204, a natural language request for additional information from the user that can be used to refine the user's initial prompt 306 prior to submission to the generative AI model 226. As part of this process, the generative AI component 208 can prompt the user for specific items of additional information that will refine or enhance the initial prompt 306 in a manner that improves the likelihood that the model 226 will generate an accurate support response that satisfies the user's requirements. In this way, the generative AI component 208 can carry out an iterative natural language dialogue with the user, prompting the user to provide sufficient details about the technical support issue to ensure that the system 202 provides highly reliable and accurate technical support guidance.

To reduce or eliminate the possibility of hallucinations or other inaccurate outputs by the generative AI model 226, the context retrieval component 206 can supplement the user's natural language prompt 306 with relevant contextual data 316 and chat history data 308 retrieved from data sources maintained by, or otherwise accessible to, the technical support system 202. These data sources can include a repository of stored documentation 314 as well as a repository of chat histories 312 that led to solutions to past technical support issues.

Stored documentation 314 that can be maintained by the system 202 and accessed by the context retrieval component 206 can include, but is not limited to, programming manuals, industrial device manuals or product specification sheets, functional specification documents, knowledgebase articles describing solutions to known problems associated with specific industrial devices or software (which may be submitted to the system 202 by vendors of those devices for storage in the documentation repository), failure code information, or other such documents. Documentation 314 may also include logistics data for one or more product vendors or support entities, including information regarding availability of products such as replacement devices or parts as well as expected shipping lead times for these products.

In some embodiments, the system 202 can maintain both a globally accessible repository of documentation 314 that is accessed by the context retrieval component 206 in response to all prompts 306 regardless of the customer entity from which the prompt 306 was received, as well as individual customer-specific repositories of documentation assigned to respective different customer entities. In such embodiments, the system 200 allows each customer entity to submit their own proprietary documentation to their assigned documentation repository for storage in their customer-specific document repository. This customer-specific documentation can include, for example, plant standards, preferred device vendors, documentation on in-house programming standards, inventory information itemizing devices or equipment that is either in use or in inventory at the customer facility, maps of the customer's industrial facilities, or other such documentation. When a prompt 306 is retrieved from a user associated with a customer entity, the context retrieval component 206 will retrieve relevant contextual data 316 one or both of the globally accessible documentation 314 and the customer-specific documentation associated with the customer entity.

Archived chat histories 312 can comprise the content of chat sessions between the system 202 and various users across multiple different customer entities. Each chat history 312 can include the prompts 306 submitted by the user during a support session, as well as the support guidance, information, or resolution recommendations generated by the generative AI model 226 in response to these prompts 306. In some embodiments, each chat history 312 can also record feedback that was provided by the user indicating a degree to which system's responses addressed the concern specified by the initial prompt 306. This information can be leveraged by the generative AI model 226 when formulating responses to subsequent similar prompts 306.

Figure 4:
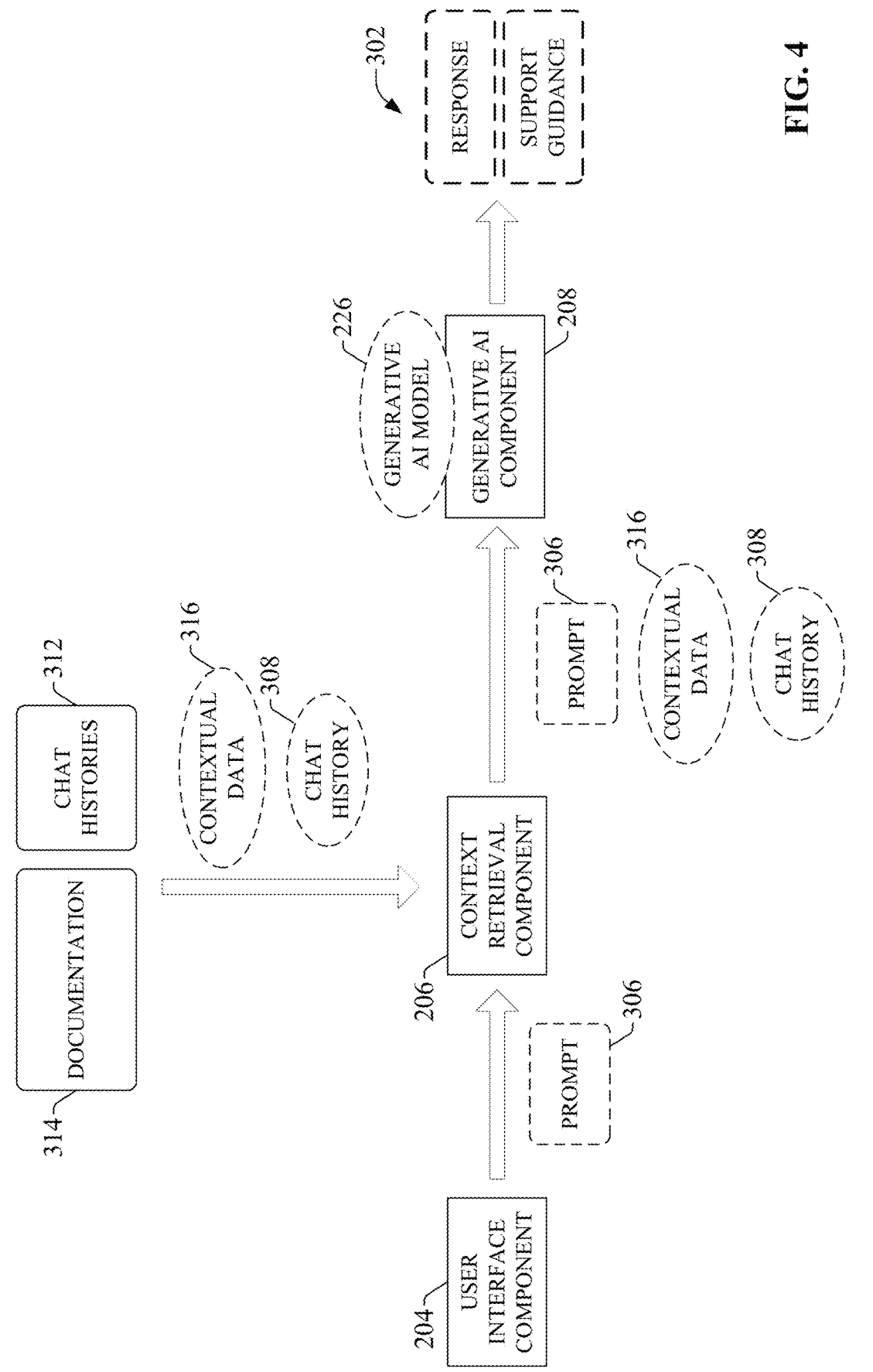
FIG. 4 is a diagram illustrating enhancement of a user prompt with contextual data and previous chat history data prior to submission to a generative AI model.

FIG. 4 is a diagram illustrating enhancement of a user prompt 306 with contextual data 316 and previous chat history data 308 prior to submission to the generative AI model 226. When a prompt 306 is received from a user associated with a customer entity (e.g., "Suggest remedy for high syslog memory alarm"), the context retrieval component 206 analyzes the content of the prompt 306 and retrieves, from the stored documentation 314, a subset of information from this stored documentation 314 determined to be relevant to the prompt 306. The context retrieval component 206 then adds this subset of documentation information to the prompt 306 as contextual data 316. The selected subset of documentation information can depend on such factors as the devices, machines, or industrial assets identified in the user's prompt 306 (which may guide selection of information from corresponding product manuals or knowledgebase articles stored as part of the documentation 314); the nature of the technical support request conveyed by the prompt 306; an identity of a specific alarm for which assistance is requested; or other such information.

As noted above, each registered customer entity can be assigned a customer-specific document repository in which the customer can store their own proprietary documentation. This proprietary documentation can be used by the technical support system 202 to customize the model's responses 302 in accordance with the customer's equipment, standards, protocols, or preferences. Accordingly, when a prompt 306 is received from a user associated with a customer entity, the context retrieval component 206 can retrieve relevant contextual data 316 from one or both of the customer-agnostic set of documentation 314 and the customer-specific documentation stored for that customer entity.

Additionally, the context retrieval component 206 can identify any previous chat histories 312 stored in the archived chat histories 312 that were directed to a customer support issue determined to be similar to the issue described by the prompt 306 currently being processed, and add these similar chat histories to the prompt 306 as chat history data 308. These similar chat histories can include information regarding how technical support issues similar to that described in the prompt 306 were resolved in the past, as well as metrics regarding how well the resolutions proposed by the model 226 satisfied the users' issues (e.g., in the form of user feedback or ratings).

Once the context retrieval component 206 has enhanced the prompt 306 with relevant contextual data 316 and chat history data 308, the generative AI component 208 analyzes the combined prompt 306, contextual data 316, and chat history data 308, and generates a response 302 to the prompt based on a result of this analysis. The user interface component 204 can then render this response 302 on the user's client device 310. The nature of the response 302 depends on the type of support being requested by the prompt 306. For example, if the prompt 306 requests assistance in addressing an alarm condition on an industrial asset, the response 302 can provide a natural language explanation of the alarm together with suggested actions or steps that can be performed to correct the alarm condition. In response to a prompt 306 comprising a question about an industrial device or asset (e.g., a question regarding how to perform a specified maintenance operation on the asset, a query about an estimated amount of time required to perform the maintenance operation, a request for suggested preventative maintenance actions to be performed on the asset in order to improve a performance metric or extend the assets lifecycle, etc.), the response 302 can be a natural language answer to the user's question. In all cases, the generative AI model 226 leverages the contextual data 316 and chat history data 308 in connection with formulating the response 302, ensuring that the response 302 is catered to the specific use case conveyed by the prompt 306.

FIG. 5 is an example chat window 502 that can be generated by the user interface component 204 and used to interact with the generative AI model 226. The example chat window 502 includes a data entry field 506 through which a user can submit prompts 306 to the model 226. In the illustrated example, the user has submitted a prompt 306 requesting a remedy for a specified alarm that the user has observed on an industrial asset ("Suggest remedy for high syslog memory alarm."). In response to submission of this prompt 306, the context retrieval component 206 enhances the prompt 306 with relevant contextual data 316 and chat history data 308, and the model 226 generates its response 302 to the prompt 306 based on this aggregated information, as described above in connection with FIGS. 3 and 4. The user interface component 204 renders the model's response 306 in a response section 504 of the chat window 502. In the illustrated example, the response 306 is in the form of a numbered and ordered list of steps to be performed in order to remedy the indicated alarm.

Figure 6:
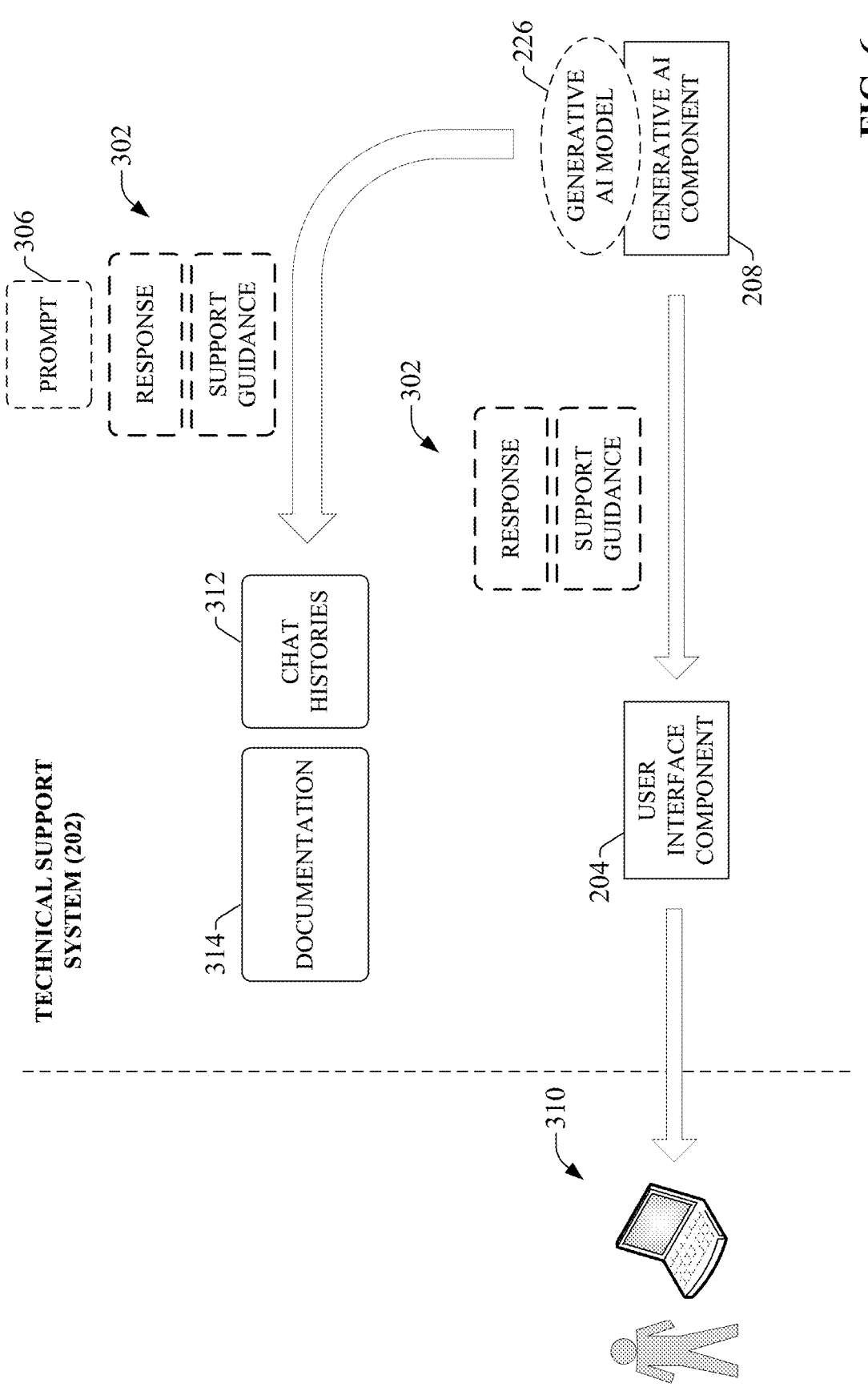
FIG. 6 is a diagram illustrating delivery and storage of a response generated by a generative AI model response.

FIG. 6 is a diagram illustrating delivery and storage of the model's response 302. When the generative AI model 226 has generated a response 306 to the user's prompt 306, the response 302 is submitted to the user interface component 204 for rendering on the user's client device 310 (e.g., via window 502 illustrated in FIG. 5). Additionally, the user's prompt 306 is stored in the chat repository 312 in association with the model's responses 302 to the prompt 306, making the prompt 306 and responses 302 accessible to the context retrieval component 206 for use in refining the model's responses 302 to similar prompts 306 in the future. If the user provides feedback indicating a degree to which the model's response 302 addressed the user's issue, the generative AI component 208 can also store this feedback information in association with the prompt 306 and corresponding responses 302.

As noted above, some embodiments of the technical support system 202 can be an integrated automated support sub-system of an industrial monitoring and notification system that monitors industrial assets and manufacturing operations for multiple, geographically diverse customer entities and delivers real-time alerts or reports to those customer entities based on this operations tracking. In such embodiments, in addition processing natural language prompts 306 submitted by users, the technical support system 202 can monitor status and operational data for customers' industrial assets during operation and leverage the generative AI techniques described herein to real-time support guidance or countermeasures in response to detected performance issues.

Figure 7:
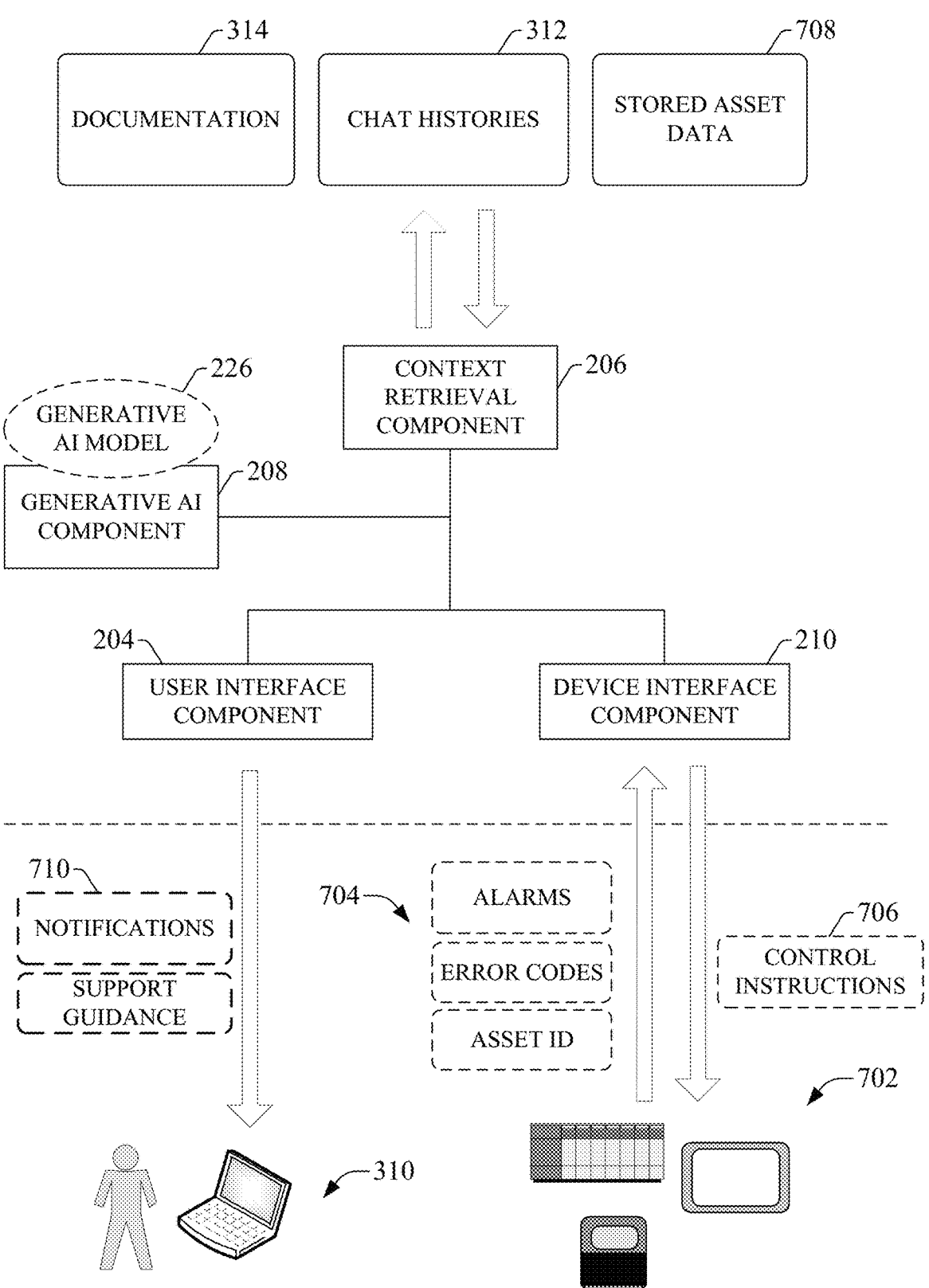
FIG. 7 is a diagram illustrating an example architecture in which technical support system detects and responds to alarms or other industrial asset performance issues in substantially real-time.
Figure 8B:
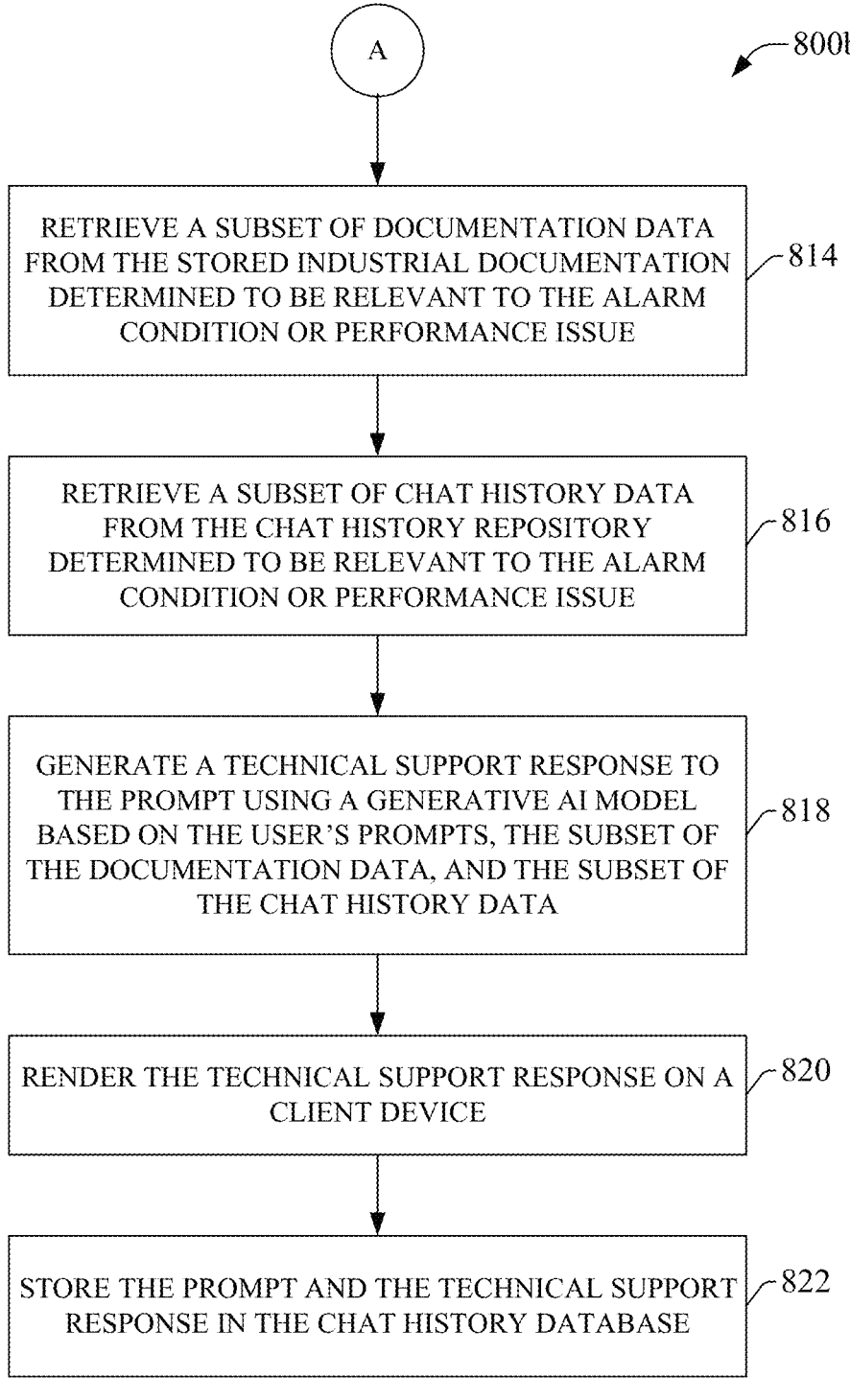
FIG. 8*b* is a flowchart of a second part of the example methodology for using generative AI to provide technical guidance for resolving industrial alarm conditions or other automation system performance problems.

FIG. 7 is a diagram illustrating an example architecture in which the context retrieval component 206 and generative AI component 208 are used to detect and respond to alarms or other industrial asset performance issues in substantially real-time. In this example architecture, the technical support system 202 includes a device interface component 210 configured to remotely monitor or collect runtime data 704 from industrial assets 702 (e.g., industrial devices such as controllers 118, motor drives, telemetry devices, sensors, network infrastructure devices such as switches or routers, etc.) that make up automation systems operating within plant facilities. This runtime data 704 can comprise operational and status data generated by these industrial assets during operation of their associated automation systems. The device interface component 210 and its associated services can monitor industrial assets 702 across multiple facilities owned by different customer entities who are registered to use the technical support system 202. This runtime embodiment of the technical support system 202 provides proactive generative AI-assisted notifications and support guidance to those customer entities based on monitoring and analysis of their respective sets of runtime data 704. Device interface component 210 can remotely access customer's industrial assets over any secure communication path, via any intervening public or private networks.

At least some of the runtime data 704 monitored by the system 202 comprises alarm data generated by the industrial assets 702. This alarm data signifies an abnormal status or condition experienced by an industrial asset 702, and can include information identifying the nature of the alarm (e.g., an alarm number or description, an error code, etc.). The monitored runtime data 704 can also include asset identification information collected from each industrial asset 702, which either directly or implicitly identifies the asset (e.g., a product serial number, an asset name, a device vendor and model, etc.).

As runtime data 704 is collected from industrial assets 702 by the device interface component 210 during operation of their corresponding automation systems, any alarm conditions detected in the data 704 are processed by the context retrieval component 206 and generative AI component 208 in a manner similar to that described above for processing user-provided prompts 306. Specifically, the context retrieval component 206 retrieves contextual data 316 and chat history data 308 determined to be relevant to the detected alarm condition, based on the nature of the alarm condition (e.g., the alarm description or its associated alarm or error code) as well as the identity of the industrial asset 702 experiencing the alarm condition. The contextual data 316 retrieved for a given alarm condition may include, for example, additional information about the alarm condition or relevant troubleshooting information obtained from a product manual for the industrial asset. Relevant chat history data 308 retrieved in response to detection of the alarm condition may include past dialogs between users and the generative AI model 226 in connection with resolving the same or similar alarm conditions experienced on similar industrial assets. The alarm information collected from the industrial asset is then provided to the generative AI component 208 together with the retrieved contextual data 316 and chat history data 308, and the generative AI model 226 generates recommended actions or support guidance for addressing the alarm condition based on analysis of this aggregated information. The user interface component 204 can then deliver proactive notifications 710 of the alarm condition to client devices 310 associated with relevant plant personnel (e.g., personnel responsible for maintaining the industrial asset experiencing the alarm condition) together with the recommendations or guidance for addressing the condition. The support guidance generated by the model 226 can include, for example, descriptions of steps to be taken to resolve the root cause of the alarm condition and clear the alarm (which may include navigational instructions directing the user to the location of the asset), recommendations for replacing an asset if the alarm condition cannot be resolved, directions or other such information.

In some embodiments, in addition to or as an alternative to providing support guidance, the generative AI component 208 and device interface component 210 can send control instructions 706 to the industrial assets 702 in response to detection of an alarm condition and determination of a corresponding countermeasure by the generative AI model 226. These control instructions 706 can be designed to implement at least a portion of the corrective countermeasures determined by the model 226, and can comprise, for example, instructions to modify a setpoint of a controlled industrial process, instructions to change an operating mode of a device or a machine (e.g., switching a machine to a safe state, such as a stopped or slow operating mode), instructions to change a speed of a process or motion control device in a manner that mitigates an impact of the abnormal condition conveyed by the alarm, or other such instructions. In some scenarios, the control instructions 706 can initiate their control actions by remotely altering values of analog or digital data tags or registers of industrial controllers or other industrial devices in order to implement the corrective measures devised by the model 226.

Some embodiments of the technical support system 202 can further cater the model's responses 302 to user prompts 306, recommended support guidance, or control instructions 706 based on unique environmental or contextual conditions in which the relevant industrial assets 702 operate. For example, it may be the case that industrial assets 702 or machines that operate in warmer locations or in plant facilities having relatively high levels of particulates in the air are more susceptible to certain alarm conditions or operational issues than similar assets or devices operating in other types of climates or environments. As such, countermeasures for alarm conditions that arise on assets within these types of environments may be different than those generated for similar assets in other environments. The generative AI model 226 can generate responses 302 or control instructions 706 for addressing alarm conditions for these industrial assets 702 that take these contextual factors into consideration.

To this end, the device interface component 210 can store runtime data 704 collected from the industrial assets 702 in an asset data repository 708. In some embodiments, each registered customer entity may be designated a customer-specific asset data repository 708 that exclusively maintains runtime data 704 collected from that customer's industrial assets 702. The generative AI model 226 can analyze this collected runtime data 704 to learn operational or alarm trends for individual industrial assets 702 that may deviate from the trends typically expected for similar industrial assets 702, which may indicate a contextual factor of the asset's environment that affects the asset's performance.

When a user submits a prompt 306 relating to an industrial asset 702, or when an alarm condition is detected in the asset's runtime data 704, the context retrieval component 206 can retrieve relevant contextual data 316 and chat history data 308 for the prompt 306 or alarm as described above, and the generative AI model 226 can analyze this aggregated information together with learned performance trends for the individual asset as learned from the asset's stored asset data, and formulate the response 302 to the prompt 306 (or the countermeasure to the detected alarm condition) based on this analysis.

The industrial technical support system 202 described herein can expedite the process of finding resolutions to asset performance issues or alarm conditions by leveraging generative AI together with selected contextual data determined to be relevant to the issue being addressed. The system's generative AI model leverages multiple data sources to augment its knowledgebase, and these data sources remain updated with recent documentation and resolution notes to ensure continued accuracy of support guidance and corrective countermeasures.

FIGS. 8a-9b illustrate a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8a illustrates a first part of an example methodology 800a for using generative AI to provide technical guidance for resolving industrial alarm conditions or other automation system performance problems. Initially, at 802, industrial documentation is stored in a document repository associated with an industrial technical support system. This industrial documentation can include, for example, programming manuals, industrial device manuals or product specification sheets, functional specification documents, knowledgebase articles describing solutions to known problems associated with specific industrial devices or software, failure code information, or other such documents.

At 804, archived chat history data and alarm resolution nots are stored in a chat history repository associated with the industrial technical support system. The archived chat histories can comprise the content of chat sessions between the technical support system and users associated with multiple customer entities. Each chat history in the repository can include natural language prompts submitted by a user during a technical support session, as well as the support guidance, information, or resolution recommendations generated by the technical support system in response to these prompts.

At 806, a natural language prompt for assistance with alarm condition or performance issue being observed on an industrial asset is received via the technical support system's user interface. The prompt can specify, via natural language, the nature of the alarm or performance issue for which assistance or guidance is required. For example, the prompt may request information about an industrial asset or an observed behavior of the asset, recommended countermeasures for observed alarms or performance issues, recommended preventative actions for mitigating future performance problems with the asset or for extending the lifecycle of the asset, or other such support guidance.

At 808, the prompt is analyzed by the technical support system using a to determine if sufficient information can be inferred from the prompt to allow a generative AI model to generate technical support guidance having a high likelihood of addressing the concern conveyed in the prompt, and a determination is made as to whether more information is needed from the user in order to generate accurate technical support guidance. If additional information is required (YES at step 808), the methodology proceeds to step 810, where the generative AI model determines the additional information required, and a natural language request designed to guide the user toward providing the additional information is rendered on the user interface.

Steps 808-812 are repeated as a natural language dialog with the user until sufficient information has been obtained. When no further information is required from the used (NO at step 808), the methodology proceeds to the second part 800*b* illustrated in FIG. 8*b*. At 814, a subset of the documentation data stored at step 802 that is determined to be relevant to the alarm condition or performance issue conveyed by the prompt is retrieved from the document repository. At 816, a subset of chat history data stored at step 804 that is determined to be relevant to the alarm condition or performance issue is retrieved from the chat history repository. At 818, a natural language technical support response to the prompt is generated using a generative AI model based on the user's prompts, the subset of the documentation data retrieved at step 814, and the subset of the chat history data retrieved at step 816. The response can be generated in any suitable format, based on part on the nature of the prompt. Example responses include natural language explanations of alarm conditions together with suggested actions or steps that can be performed to correct the alarm condition, answers to questions about an industrial asset or device, or other such responses. At 822, the prompt and the technical support response generated in response to the prompt are stored in association with one another in the chat history repository for use by the generative AI model in generating responses to subsequent similar prompts.

Figure 9A:
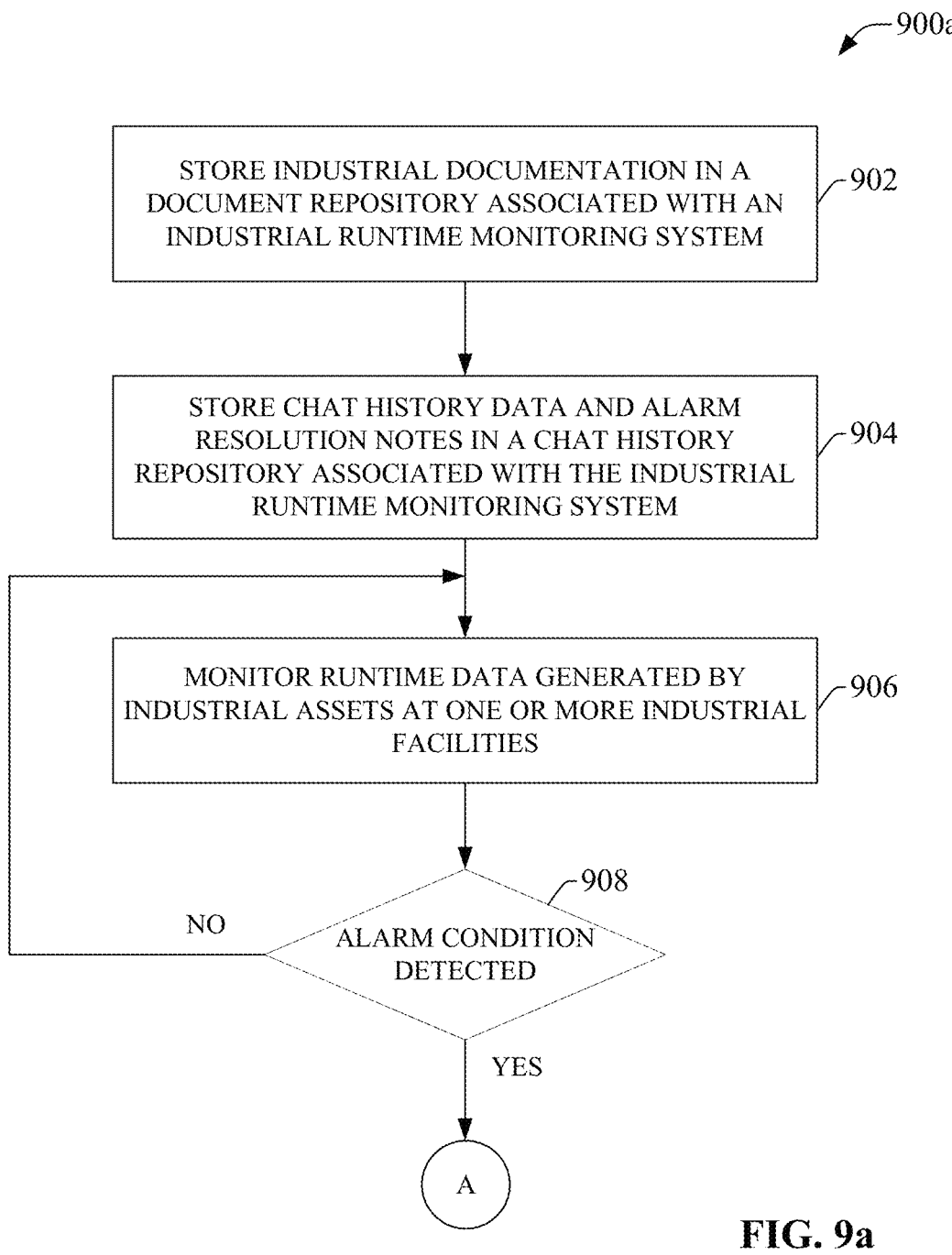
FIG. 9*a* is a flowchart of a first part of an example methodology for using generative AI to implement real-time control countermeasures that address alarm conditions detected by an industrial runtime monitoring system.
Figure 9B:
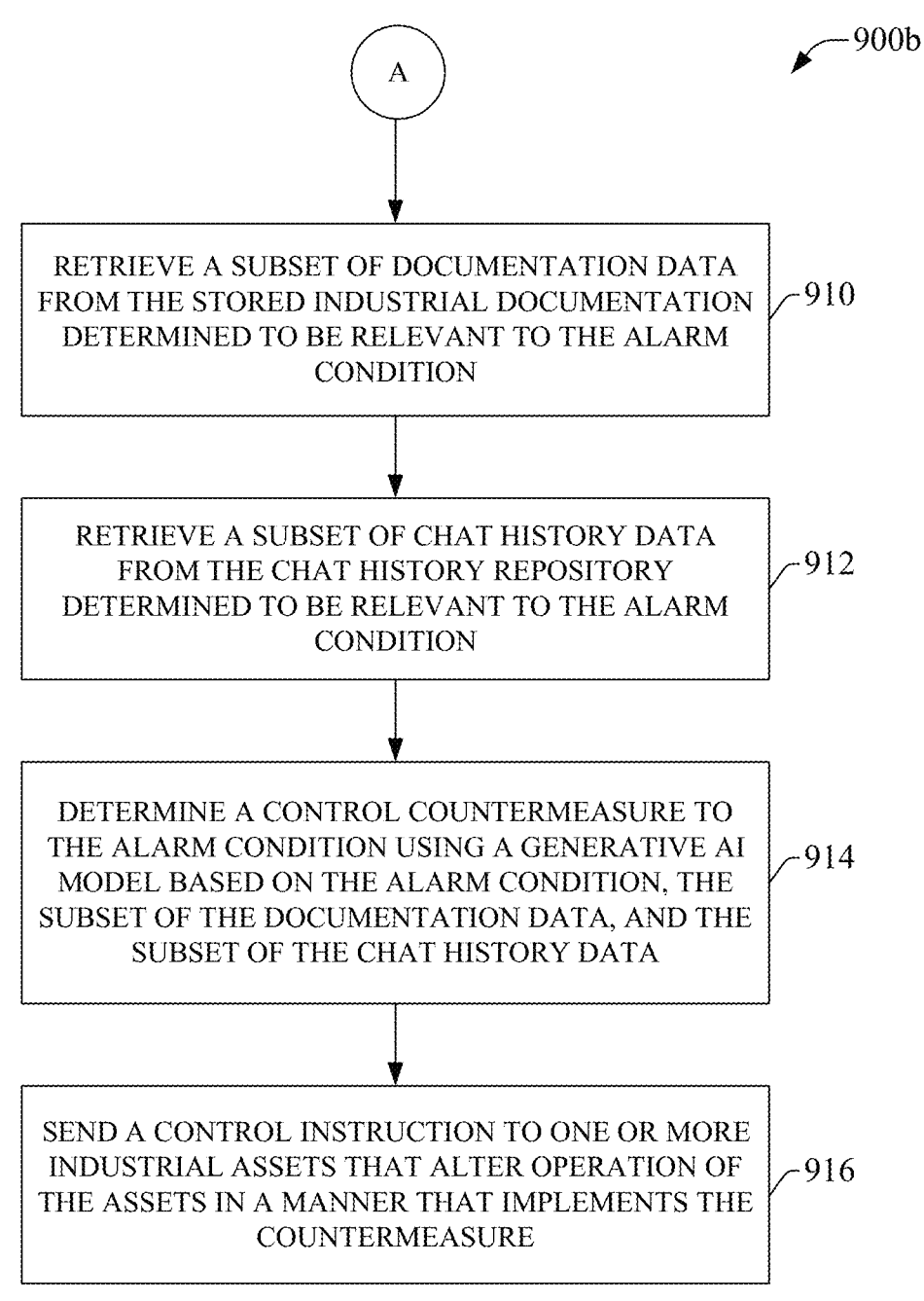
FIG. 9*b* is a flowchart of a second part of the example methodology for using generative AI to implement real-time control countermeasures that address alarm conditions detected by an industrial runtime monitoring system.

FIG. 9*a* illustrates a first part of an example methodology 900*a* for using generative AI to implement real-time control countermeasures that address alarm conditions detected by an industrial runtime monitoring system. Initially, at 902, industrial documentation is stored in a document repository associate with an industrial runtime monitoring system (similar to step 802 of methodology 800*a*). At 904, chat history data and alarm resolution notes are stored in a chat history repository associated with the industrial runtime monitoring system (similar to step 804 of methodology 800*a*).

At 906, runtime data generated by industrial assets at one or more industrial facilities are monitored by the runtime monitoring system. The runtime data can include status and operational data generated by industrial assets, devices, or sensors that make up one or more industrial automation systems. This data can include alarm information or error codes generated by the assets when an abnormal condition is experienced on those assets. At 908, a determination is made as to whether an alarm condition is detected in the runtime data. If no alarm condition is detected (NO at step 908), the methodology returns to step 906 and monitoring continues. Alternatively, if an alarm condition is detected (YES at step 908), the methodology proceeds to the second part 900*b* illustrated in FIG. 9*b*.

At 910, a subset of the documentation data stored at step 902 determined to be relevant to the detected alarm condition is retrieved. At 912, a subset of the chat history data or resolution noted determined to be relevant to the alarm condition is retrieved. At 914, a control countermeasure to the alarm condition is determined using a generative AI model based on the identity of the alarm condition, the subset of the documentation data obtained at step 910, and the subset of the chant history data or resolution notes obtained at step 912. At 916, a control instruction is sent to one or more of the industrial assets to alter the operation of those assets in a manner that implements the countermeasure determined at step 914. Substantially any type of countermeasure can be implemented by the control instruction, including but not limited to adjusting a setpoint value, changing an operating mode of an asset or device, placing a machine in a safe state, clearing an alarm, or other such control countermeasures.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC (programmable logic controller) or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 10:
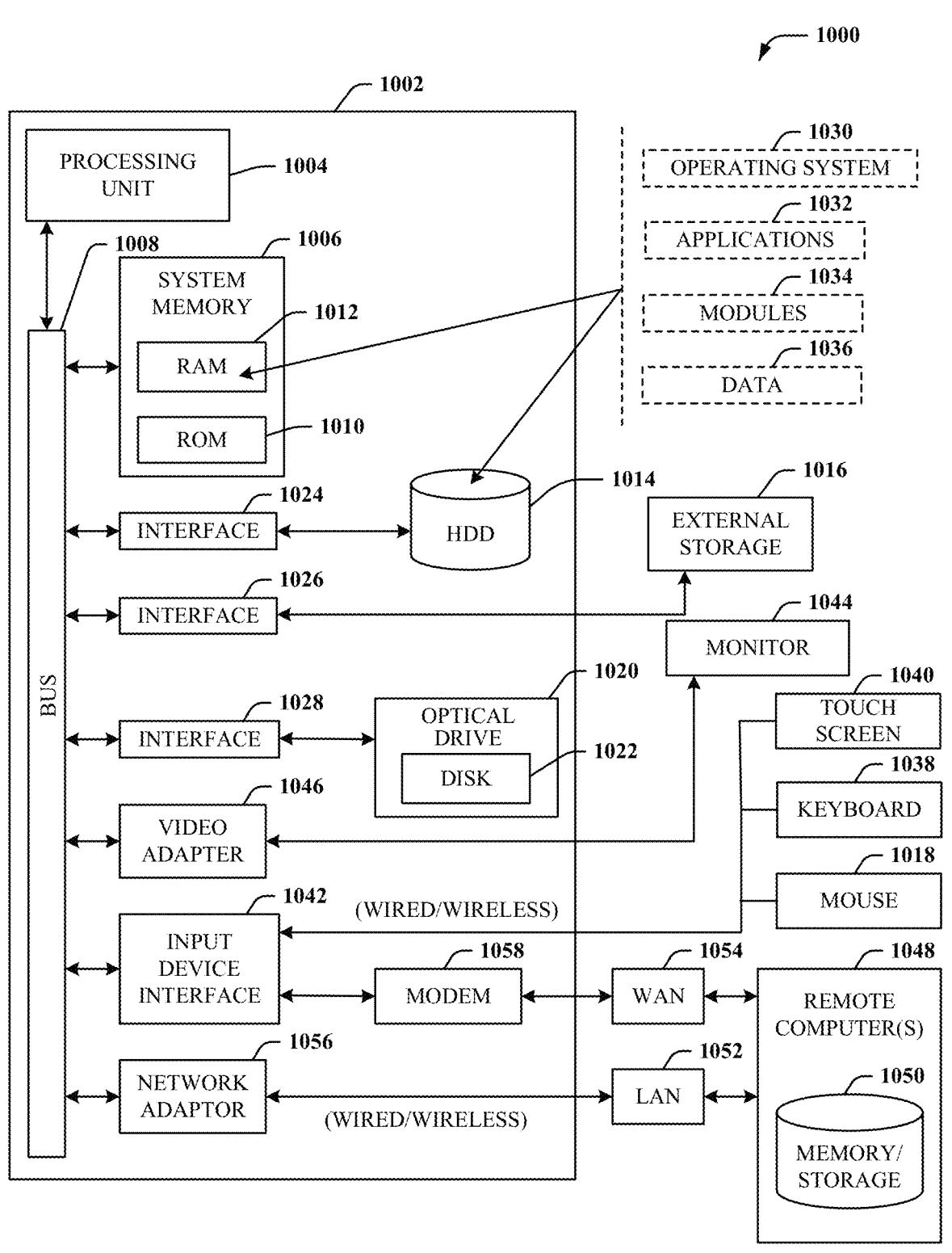
FIG. 10 is an example computing environment.
Figure 11:
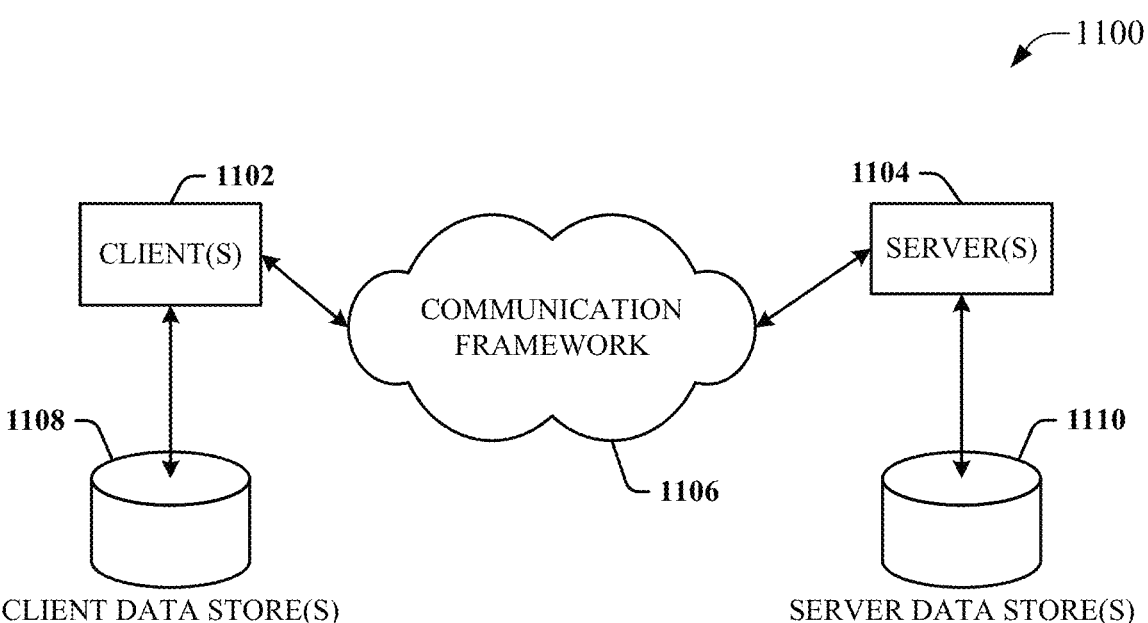
FIG. 11 is an example networking environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for application programs 1032. Runtime environments are consistent execution environments that allow application programs 1032 to run on any operating system that includes the runtime environment. Similarly, operating system 1030 can support containers, and application programs 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1018. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the adapter 1056 in a wireless mode.

When used in a WAN networking environment, the computer 1002 can include a modem 1058 or can be connected to a communications server on the WAN 1054 via other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1052 or WAN 1054 e.g., by the adapter 1056 or modem 1058, respectively. Upon connecting the computer 1002 to an associated cloud storage system, the external storage interface 1026 can, with the aid of the adapter 1056 and/or modem 1058, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 2100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components and a generative artificial intelligence (AI) model; and
a processor, operatively coupled to the memory, that executes the executable components, the executable components comprising:
a device interface component configured to monitor runtime data generated by industrial assets of an industrial automation system;
a context retrieval component configured to, in response to detection of an alarm condition based monitoring of the runtime data:
retrieve contextual data determined to be relevant to the alarm condition from a repository of industrial documentation, and
retrieve chat history data determined to be relevant to the alarm condition from archived histories of chats with the generative AI model; and
a generative AI component configured to
submit, as a prompt, the contextual data, the chat history data, and information about the alarm condition to the generative AI model, and
determine, based on a response to the prompt generated by the generative AI model, a countermeasure that at least one of mitigates the alarm condition or mitigates an effect of the alarm condition,
wherein the device interface component is further configured to send a control instruction to one or more of the industrial assets that causes the one or more industrial assets to perform the countermeasure.

2. The system of claim 1, wherein the industrial documentation stored in the repository of industrial documentation comprises at least one of programming manuals, industrial device manuals, industrial device product specification documents, functional specification documents, knowledge-base articles describing solutions to problems associated with industrial devices or software, or failure code documentation.

3. The system of claim 1, wherein the archived histories of chats comprise prompts submitted to the system requesting assistance with technical support issues and responses generated by the generative AI model indicating resolutions to the technical support issues.

4. The system of claim 1, wherein
the prompt is a first prompt,
the contextual data is first contextual data,
the chat history data is first chat history data,
the executable further comprise a user interface component configured to receive, as natural language input, a second prompt specifying a technical support issue relating to the industrial automation system, and
the context retrieval component is further configured to, in response to receipt of the second prompt:
retrieve second contextual data determined to be relevant to the technical support issue from the repository of industrial documentation,
retrieve second chat history data determined to be relevant to the technical support issue from the archived chat histories, and submit the second contextual data, the second chat history data, and the second prompt to the generative AI component.

5. The system of claim 4, wherein
the generative AI component is further configured to generate, using the generative AI model, a natural language response to the second prompt based on analysis of the second prompt, the second contextual data, and the second chat history data,
wherein the natural language response describes one or more recommended actions for addressing the technical support issue.

6. The system of claim 4, wherein the second prompt specifies at least one of an industrial asset experiencing a performance issue, a description of the performance issue, an identity of an alarm generated by an industrial asset, a request for recommended preventative measures to perform on an industrial asset for mitigating future performance issues, or a request for guidance in performing a maintenance task on an industrial asset.

7. The system of claim 4, wherein the natural language response comprises at least one of an explanation of an alarm condition, an ordered list of steps for performing a corrective measure that addresses the technical support issue, or an estimate of an amount of time required to perform the one or more recommended actions for addressing the technical support issue.

8. The system of claim 4, wherein the generative AI component is further configured to store the second prompt and the natural language response with the archived histories of chats.

9. The system of claim 1, wherein the countermeasure is at least one of placing a machine in a safe operating mode, placing a machine in a stopped mode, modifying a setpoint value of a controlled industrial process, changing an operating mode of a machine, clearing an alarm, or initiating a notification of the alarm condition.

10. A method, comprising:
monitoring, by a system comprising a processor, runtime data generated by industrial assets of an industrial automation system;
in response to detecting an alarm condition based on the monitoring of the runtime data:
retrieving, by the system, contextual data determined to be relevant to the alarm condition from a repository of industrial documentation;
retrieving, by the system, chat history data determined to be relevant to the alarm condition from archived chat histories;
submitting, by the system as a prompt, the contextual data, the chat history data, and information about the alarm condition to a generative artificial intelligence (AI) component;
determining, by the system based on a response to the prompt generated by the generative AI model, a countermeasure that at least one of mitigates the alarm condition or mitigates an effect of the alarm condition; and
sending, by the system, a control instruction to one or more of the industrial assets that causes the one or more industrial assets to perform the countermeasure.

11. The method of claim 10, wherein the industrial documentation stored in the repository of industrial documentation comprises at least one of programming manuals, industrial device manuals, industrial device product specification documents, functional specification documents, knowledgebase articles describing solutions to problems associated with industrial devices or software, or failure code documentation.

12. The method of claim 10, wherein the archived chat histories comprise prompts submitted to the system requesting assistance with technical support issues and responses generated by the generative AI model in response to the prompts indicating resolutions to the technical support issues.

13. The method of claim 10, wherein
the prompt is a first prompt,
the contextual data is first contextual data,
the chat history data is first chat history data,
the method further comprises:
receiving, from a client device, a second prompt formatted as a natural language input and requesting assistance with a technical support issue relating to the industrial automation system;
in response to the receiving:
retrieve second contextual data determined to be relevant to the technical support issue from the repository of industrial documentation,
retrieve second chat history data determined to be relevant to the technical support issue from the archived chat histories, and
submit the second contextual data, the second chat history data, and the second prompt to the generative AI component.

14. The method of claim 13, further comprising:
generating, by the system using the generative AI model, a natural language response to the second prompt based on analysis of the second prompt, the second contextual data, and the second chat history data,
wherein the natural language response describes one or more recommended actions for addressing the technical support issue.

15. The method of claim 13, wherein the prompt specifies at least one of an industrial asset experiencing a performance issue, a description of the performance issue, an identity of an alarm generated by an industrial asset, a request for recommended preventative measures to perform on an industrial asset for mitigating future performance issues, or a request for guidance in performing a maintenance task on an industrial asset.

16. The method of claim 13, wherein the natural language response comprises at least one of an explanation of an alarm condition, an ordered list of steps for performing a corrective measure that addresses the technical support issue, or an estimate of an amount of time required to perform the one or more recommended actions for addressing the technical support issue.

17. The method of claim 13, further comprising storing the prompt and the natural language response as part of the archived chat histories.

18. The method of claim 10, wherein the countermeasure is at least one of placing a machine in a safe operating mode, placing a machine in a stopped mode, modifying a setpoint value of a controlled industrial process, changing an operating mode of a machine, clearing an alarm, or initiating a notification of the alarm condition.

19. A non-transitory computer-readable medium having stored thereon instructions that, in response to execution, cause a system comprising a processor to perform operations, the operations comprising:
monitoring runtime data generated by industrial assets of an industrial automation system;

in response to detecting an alarm condition based on the monitoring of the runtime data:

retrieving contextual data determined to be relevant to the alarm condition from a repository of industrial documentation;

retrieving chat history data determined to be relevant to the alarm condition from archived chat histories;

submitting, as a prompt, the contextual data, the chat history data, and information about the alarm condition to a generative artificial intelligence (AI) component;

determining, based on a response to the prompt generated by the generative AI model, a countermeasure that at least one of mitigates the alarm condition or mitigates an effect of the alarm condition; and sending a control instruction to one or more of the industrial assets that causes the one or more industrial assets to perform the countermeasure.

20. The non-transitory computer-readable medium of claim 19, wherein the industrial documentation stored in the repository of industrial documentation comprises at least one of programming manuals, industrial device manuals, industrial device product specification documents, functional specification documents, knowledgebase articles describing solutions to problems associated with industrial devices or software, or failure code documentation.

* * * * *